United States Patent
Holland et al.

(10) Patent No.: US 12,227,366 B2
(45) Date of Patent: Feb. 18, 2025

(54) APPARATUSES, SYSTEMS, AND METHODS FOR PROCESS DOLLY SYNCHRONIZATION WITH ASSEMBLY LINE CONVEYORS

(71) Applicant: Toyota Motor Engineering & Manufacturing North America, Inc., Plano, TX (US)

(72) Inventors: Lloyd R. Holland, Georgetown, KY (US); Scottie L. Foster, Lawrenceburg, KY (US); Bradley J. Garcia, Louisville, KY (US); Michael C. Greenlee, Paris, KY (US); Jeffrey L. James, Mount Sterling, KY (US); Annetta L. Allen, Trenton, MI (US); Ronnie G. Kiser, Jr., Lexington, KY (US); Andrew B. Novian, Winchester, KY (US)

(73) Assignees: TOYOTA MOTOR ENGINEERING & MANUFACTURING NORTH AMERICA, INC., Plano, TX (US); TOYOTA JIDOSHA KABUSHIKI KAISHA

( * ) Notice: Subject to any disclaimer, the term of this patent is extended or adjusted under 35 U.S.C. 154(b) by 65 days.

(21) Appl. No.: 18/206,575

(22) Filed: Jun. 6, 2023

(65) Prior Publication Data
US 2024/0409320 A1 Dec. 12, 2024

(51) Int. Cl.
*B65G 35/06* (2006.01)
*B66B 21/10* (2006.01)

(52) U.S. Cl.
CPC .............. *B65G 35/06* (2013.01); *B66B 21/10* (2013.01)

(58) Field of Classification Search
CPC .......... B65G 35/06; B66B 21/10; B25H 1/00; B25H 1/0007; B25H 1/0014; B25H 1/08; B25H 1/10; B61J 1/00; B61J 1/12; B66F 9/07586; B66F 11/00
USPC ............... 198/415, 322, 345.1, 345.2, 345.3; 104/168; 269/56, 289 MR
See application file for complete search history.

(56) References Cited

U.S. PATENT DOCUMENTS 6,164,430 A * 12/2000 Nishimura ......... B65G 47/8815
198/346.2
8,011,491 B2 * 9/2011 Nakagawa ............. B62D 65/18
198/346.2

(Continued)

FOREIGN PATENT DOCUMENTS

CN 1843734 B * 5/2010
CN 209600559 U * 11/2019

(Continued)

*Primary Examiner* — Gene O Crawford
*Assistant Examiner* — Muhammad Awais
(74) *Attorney, Agent, or Firm* — Snell & Wilmer LLP

(57) ABSTRACT

Methods, systems, and apparatus for a conveyor assembly. The conveyor assembly includes a conveyor, at least one stationary track positioned parallel to the conveyor, a process dolly configured to operatively couple to the at least one stationary track, and a syncing apparatus configured to couple to the process dolly and operatively couple to the conveyor. The syncing apparatus is configured to lock the process dolly in place along the conveyor such that the process dolly moves together with the conveyor with respect to the at least one stationary track.

19 Claims, 5 Drawing Sheets

(56) References Cited

U.S. PATENT DOCUMENTS

| | | | | |
|---|---|---|---|---|
| 8,162,302 B2* | 4/2012 | Turner | ............... | B25H 1/10 |
| | | | | 269/53 |
| 8,166,634 B2* | 5/2012 | Tohyama | ............ | B62D 65/12 |
| | | | | 29/714 |
| 8,684,167 B2* | 4/2014 | Harris | ............... | B65G 1/00 |
| | | | | 198/809 |
| 10,093,334 B1* | 10/2018 | Brown | ............... | B62B 3/005 |
| 10,894,313 B2 | 1/2021 | Meyer | | |
| 2008/0056871 A1* | 3/2008 | Morgan | ............ | B62B 3/0643 |
| | | | | 414/800 |
| 2019/0358804 A1* | 11/2019 | Meyer | ............... | B25H 1/08 |
| 2020/0164936 A1* | 5/2020 | Garcia | ............ | B62D 65/026 |

FOREIGN PATENT DOCUMENTS

| | | | | |
|---|---|---|---|---|
| CN | 213768039 U | 7/2021 | | |
| CN | 113618684 A | * 11/2021 | | |
| GB | 2546551 A | * 7/2017 | ......... | B08B 15/023 |
| WO | WO-2008122381 A2 | * 10/2008 | ............ | B62D 65/18 |

\* cited by examiner

APPARATUSES, SYSTEMS, AND METHODS FOR PROCESS DOLLY SYNCHRONIZATION WITH ASSEMBLY LINE CONVEYORS

BACKGROUND

Field

The present disclosure relates generally to vehicle assembly lines and, more particularly, to process dollies for assembly line conveyors.

Description of the Related Art

Process dollies are used in manufacturing processes to carry parts, tools, and the like for use along an assembly line. In particular, in the vehicle manufacturing industry, process dollies are configured to move at the same rate as a vehicle or vehicle component along an assembly line. For a process dolly to move at the same rate as a particular vehicle component, it must be synchronized to a portion of the conveyor assembly where the particular part is located. For instance, when assembling a vehicle on a conveyor, it is common to synchronize a dolly with the conveyor so that the dolly may travel alongside the vehicle for an assembly operation. In some instances, it may be useful to synchronize the dolly at multiple locations along the vehicle. Conventionally, to synchronize a process dolly to a particular portion of the conveyor, the syncing may require an air cylinder or electricity. Current synchronization processes can be cumbersome and time-consuming, thus moving the dolly and re-syncing quickly can be difficult.

Accordingly, there is a need for a system and a method for providing a spring-loaded dolly synchronization device that can be attached to a dolly and more easily moved from one location to another location.

SUMMARY

In general, one aspect of the subject matter described in this disclosure may be embodied in a conveyor assembly. The conveyor assembly includes a conveyor, at least one stationary track, a process dolly configured to operatively couple to the at least one stationary track, and a syncing apparatus configured to couple to the process dolly and operatively couple to the conveyor. The syncing apparatus is configured to lock the process dolly in place along the conveyor.

In another aspect, the subject matter may be embodied in a syncing apparatus configured to synchronize a process dolly with a conveyor. The syncing apparatus includes a main rail having a first end and a second end opposite the first end, a first arm configured to extend from the main rail at the first end, a first biasing member configured to be disposed around the first arm, and a first wheel configured to couple to the first end of the main rail. The first biasing member is operatively coupled to the first wheel and configured to bias the first wheel to a locked position.

In another aspect, the subject matter may be embodied in a method for operating a conveyor assembly. The method includes providing a process dolly, providing a syncing assembly configured to couple to the process dolly, and applying a biasing force via at least one biasing member to at least one wheel of the syncing assembly such that the syncing assembly is in a locked position and the process dolly is synced with a conveyor of the conveyor assembly.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, vehicles, and methods for synchronizing a dolly with a conveyor during a vehicle assembly processes. For instance, a spring-loaded dolly sync device that can track with the conveyor may be attached to a dolly and can be more easily moved from one location to another location. Such a system improves productivity and eliminates the need for an air cylinder or electricity. By allowing the dolly to synchronize at multiple areas along the conveyor at multiple areas along the vehicle, the productivity is increased by not having to sync and un-sync with the air cylinder, while saving on energy costs.

The sync device may include a spring-loaded rail. The sync device may have two springs, one on each side, and two rubber wheels that roll along the conveyor belt. The springs may be configured to add pressure on the conveyor, allowing the dolly to stay in a fixed position with respect to a vehicle moving with the conveyor, allowing an assembly line worker to work in different areas of the vehicle without having to continually sync and un-sync the dolly. The springs of the sync device bias the wheels of the sync device toward the conveyor in a locked configuration where the sync device, or dolly and sync device assembly, is synced with the conveyor and moves with the conveyor. The sync device remains in the locked configuration, but when the user pushes on the dolly, applying a force that overcomes the spring bias, the wheels may be configured to roll and allow the assembly to move from one location to another location with respect to the conveyor and the vehicle. When the user releases the dolly, the spring biases the assembly in the locked configuration so that the wheels again do not roll and the dolly synchronously moves together with the conveyor and the vehicle.

Figure 1:
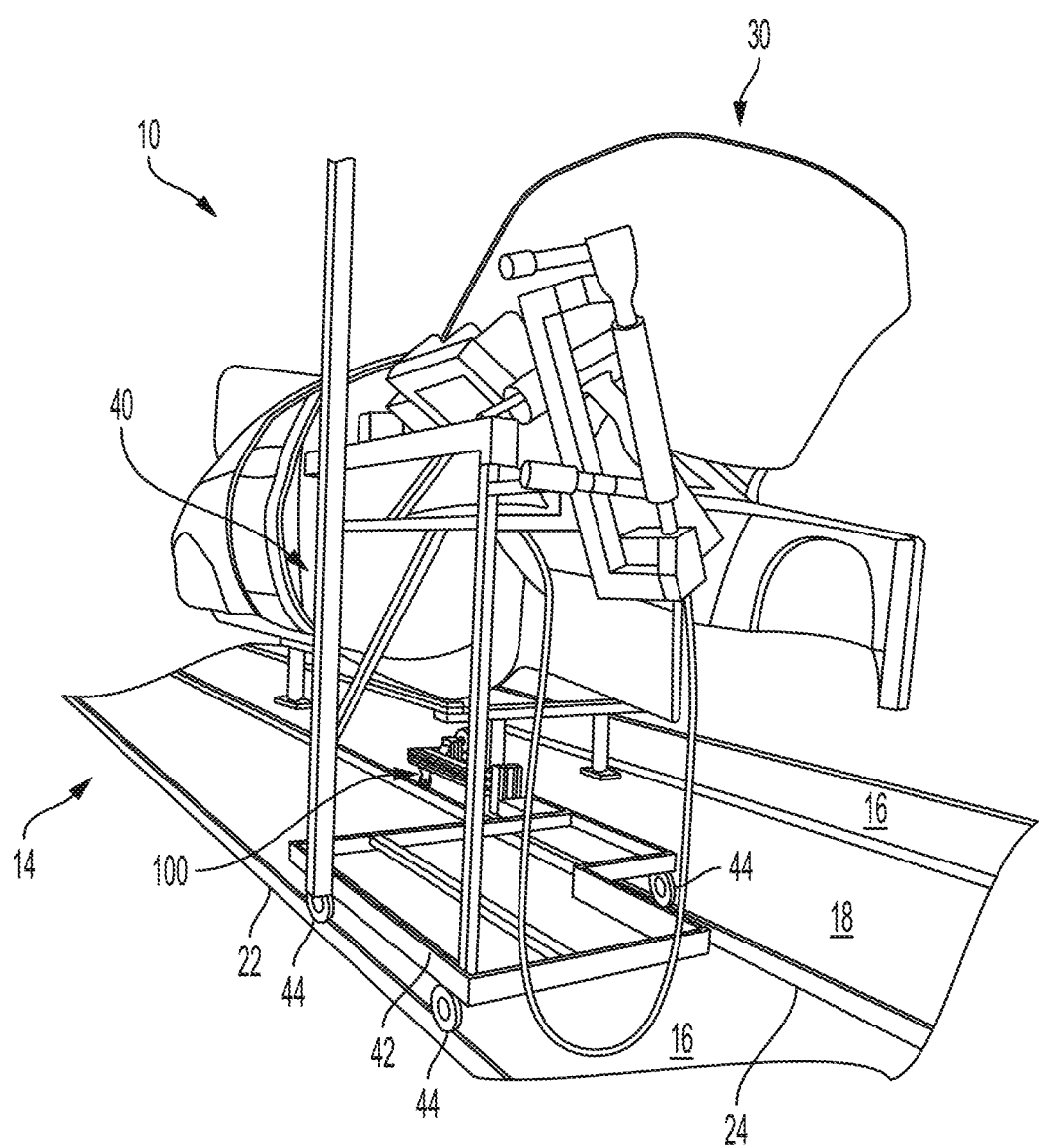
FIG. 1 illustrates a conveyor assembly according to an aspect of the invention.

FIG. 1 illustrates a conveyor assembly 10. The conveyor assembly 10 includes a conveyor 14, a process dolly 40, and a syncing apparatus 100 coupled to the process dolly 40. The conveyor 14 of the illustrated embodiment is a floor conveyor. That is, the floor conveyor is positioned in a floor or at floor level. While the illustrated embodiment shows a floor conveyor, embodiments of the present disclosure may be equally applicable to other types of conveyors including, elevated or overhead conveyors.

The conveyor 14 may include a work part conveyor portion 18 and a person conveyor portion 16. The term person can be replaced with robot throughout this disclosure, i.e., a robot conveyor portion 16. The person conveyor portion 16 can include a conveyor belt. The work part conveyor portion 18 can include a conveyor belt. The work part conveyor portion 18 and the person conveyor portion 16 may move parallel to one another at the same rate. Stated another way, the work part conveyor portion 18 and the person conveyor portion 16 move together in synchronization. The person conveyor portion 16 may allow a person to stand on the conveyor 14 at a desired location and move in synchronization with a work part 30 (e.g., a vehicle chassis) being carried along the work part conveyor portion 18. In some embodiments, there may be a person conveyor portion 16 on either side of the work part conveyor portion 18, such as illustrated in FIG. 1.

Between the work part conveyor portion 18 and the person conveyor portion 16 may be a first stationary track 24. A second stationary track 22 may be positioned at an outside edge of the person conveyor portion 16, such that the stationary tracks 22, 24 are positioned parallel to and on both sides of the person conveyor portion 16 of the conveyor 14. The stationary tracks 22, 24 allow for the process dolly 40 to remain stationary relative to the motion of the conveyor 14 prior to synchronization with the syncing apparatus 100 of the conveyor assembly 10.

Figure 2A:
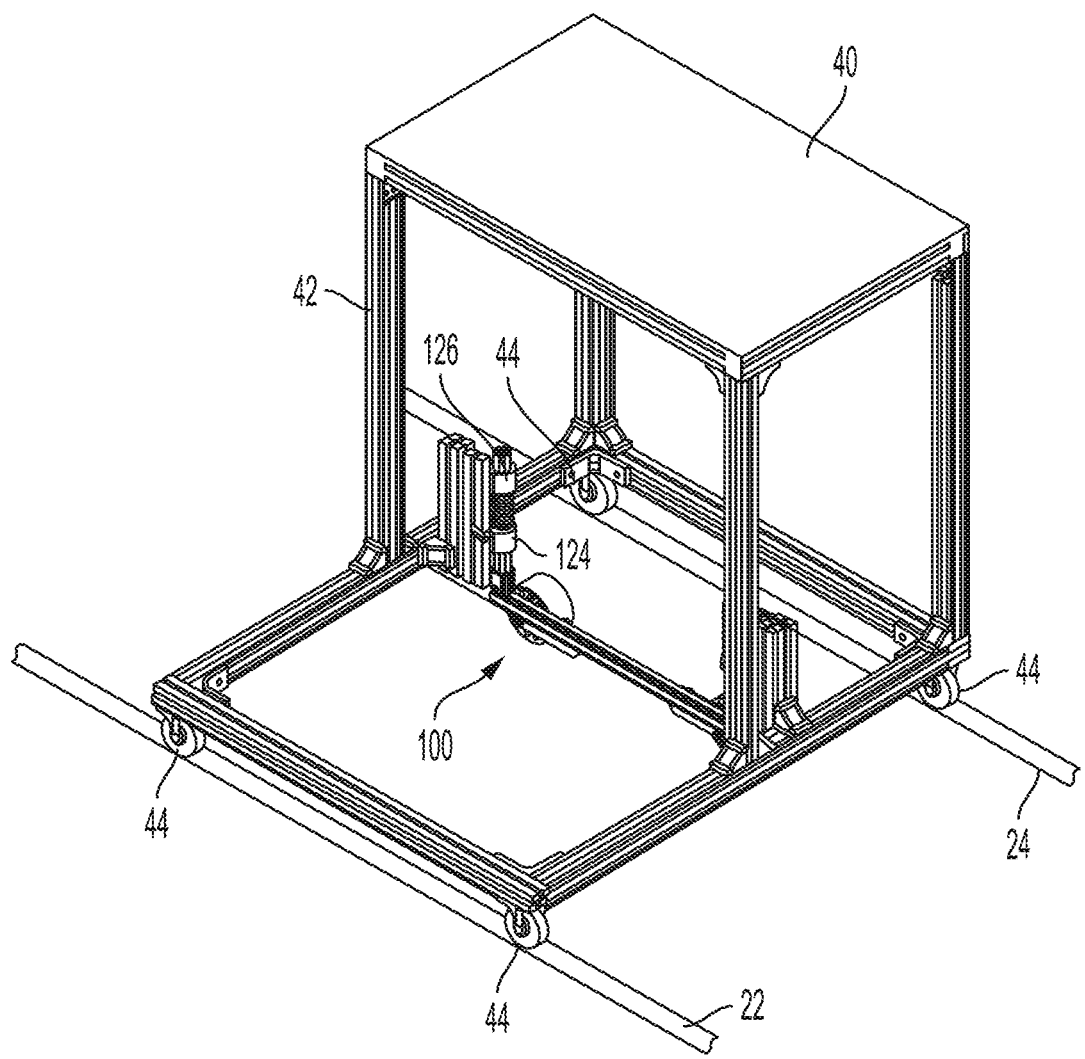
FIG. 2A illustrates a detailed view of the conveyor assembly of FIG. 1 according to an aspect of the invention.

Referring now to FIG. 1 and FIG. 2A, the process dolly 40 may include a frame 42 and wheels 44 rotatably coupled to the frame 42. The frame 42 may be configured to hold tools, parts, and the like for use on work parts 30 (e.g., a vehicle chassis) traveling along the conveyor 14. The wheels 44 of the process dolly 40 may sit within the stationary tracks 22, 24 such that the process dolly 40 is isolated from movement of the conveyor 14 until the process dolly 40 is synchronized. For instance, the syncing apparatus 100 may be configured to operatively couple the conveyor 14. The syncing apparatus 100 may be configured to operatively couple to the person conveyor portion 16 of the conveyor 14. The syncing apparatus 100 is configured to add pressure on the conveyor 14, as will be described herein. Accordingly, when synchronized, the wheels 44 of the process dolly 40 can rotate within and/or on the stationary tracks 22, 24 and traverse the stationary tracks 22, 24 in synchronization with the movement of the conveyor 14.

Figure 2B:
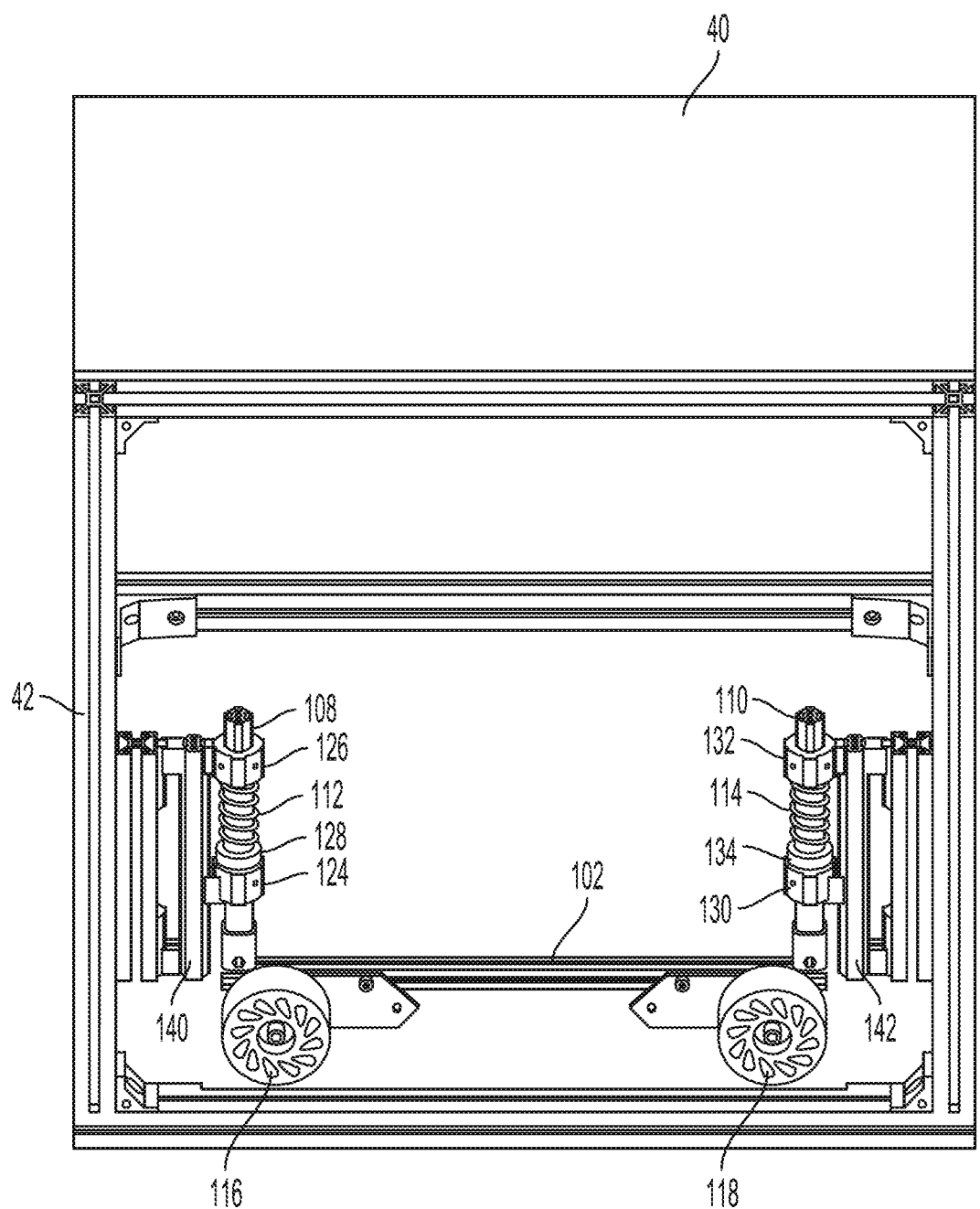
FIG. 2B illustrates a detailed view of the syncing apparatus installed on the process dolly of the conveyor assembly of FIG. 2A according to an aspect of the invention.

FIG. 2B illustrates the syncing apparatus 100 installed onto process dolly 40. The syncing apparatus 100 can be adjustably coupled to the frame 42 through one or more support brackets (e.g., a support bracket 140 and a support bracket 142) configured to be coupled to the frame 42 and the syncing apparatus 100. The syncing apparatus 100 may be a universal syncing apparatus such that the syncing apparatus may be used with any dolly (e.g., the process dolly 40).

Figure 3A:
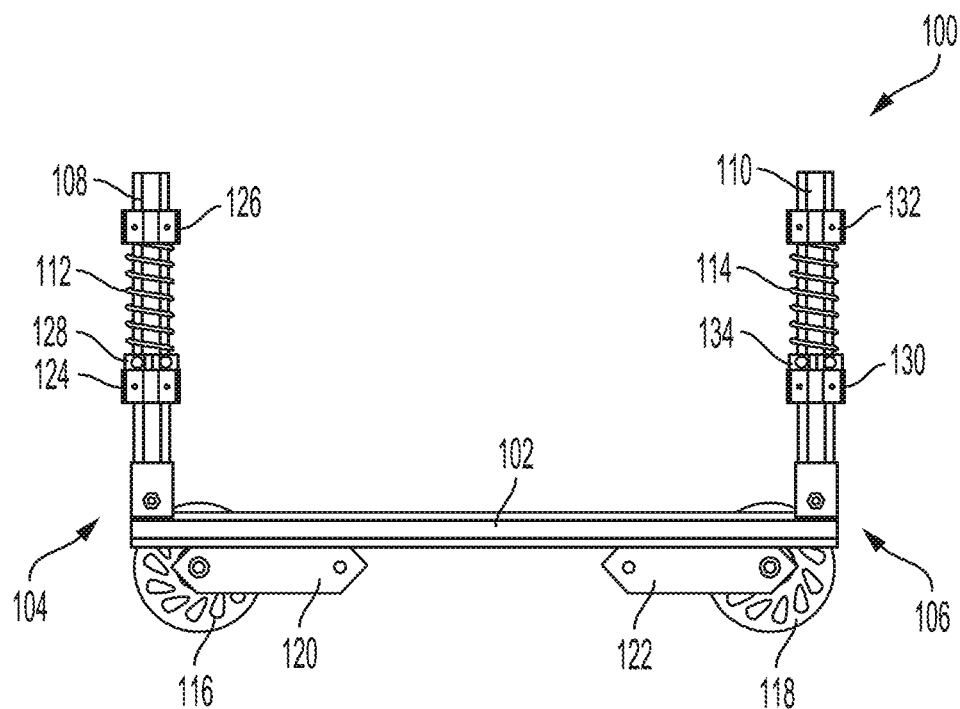
FIGS. 3A and 3B illustrate detailed views of the syncing apparatus of the conveyor assembly of FIGS. 2A and 2B according to an aspect of the invention.
Figure 3B:
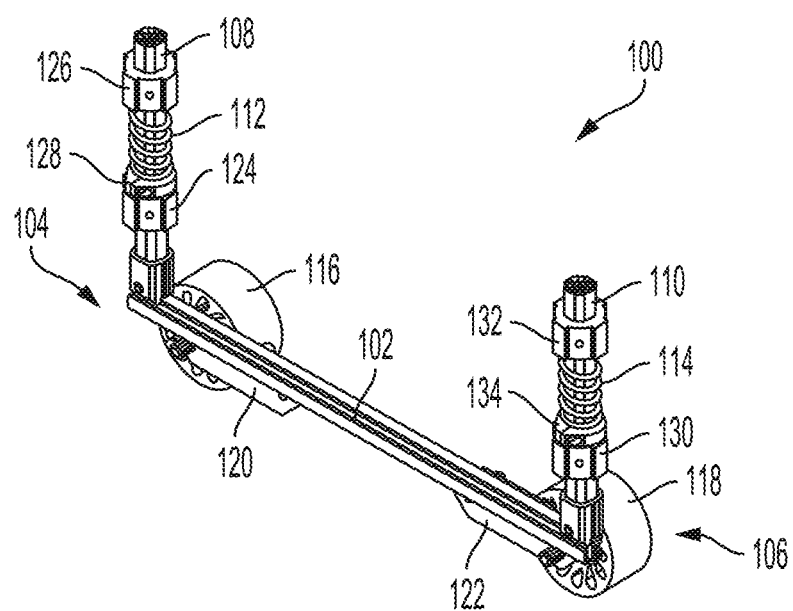

With reference to FIG. 2B, FIG. 3A, and FIG. 3B, the syncing apparatus 100 includes a main rail 102 having a first end 104 and a second end 106 opposite the first end 104. As described further herein, the main rail 102 may be configured to run parallel to the conveyor 14 and/or the stationary tracks 22, 24 (e.g., see FIG. 2A). The syncing apparatus 100 includes a first arm 108 and a second arm 110. The first arm 108 and the second arm 110 may be configured to extend from the main rail 102. For instance, the first arm 108 may be coupled to the first end 104 and extend at least substantially perpendicular to the main rail 102, and the second arm 110 may be coupled to the second end 106 and extend at least substantially perpendicular to the main rail 102.

The syncing apparatus 100 includes a first biasing member 112 and a second biasing member 114. The first biasing member 112 may be configured to be disposed around the first arm 108. The second biasing member 114 may be configured to be disposed around the second arm 112. The first biasing member 112 and the second biasing member 114 may be helical springs, for example.

The syncing apparatus 100 includes a first wheel 116 and a second wheel 118. The first wheel 116 may be configured to couple to the first end 104 of the main rail 102. The second wheel 118 may be configured to couple to the second end 106. The first and second wheels 116, 118 may be caster wheels, for example. In various embodiments, the first and second wheels 116, 118 may be foam wheels. In various embodiments, the first and second wheels 116, 118 may be rubber wheels. The first wheel 116 may include a first wheel support frame 120 configured to couple the first wheel 116 to the main rail 102 such that the first wheel 116 is rigidly aligned in a rolling direction such that contact with the first wheel 116 does not cause the first wheel 116 to swivel. The second wheel 118 may include a second wheel support frame 122 configured to couple the second wheel 118 to the main rail 102 such that the second wheel 118 is rigidly aligned in a rolling direction such that contact with the second wheel 118 does not cause the second wheel 118 to swivel.

The first biasing member 112 may be operatively coupled to the first wheel 116 and configured to bias the first wheel 116 to a locked position. Further, the second biasing member 114 may be operatively coupled to the second wheel 118 and configured to bias the second wheel 118 to a locked position. Accordingly, the first and second wheels 116, 118 are configured to contact the conveyor 14 to synchronize the process dolly 40 to the movement of the conveyor 14 when the first and second wheels 116, 118 are biased to the locked position. For instance, the first and second biasing members 112, 114 may be configured to bias the first and second wheels 116, 118, respectively, to add pressure to the process dolly 40 toward the conveyor 14, allowing the process dolly 40 to stay in position (e.g., the process dolly 40 is synced to the conveyor 14 via the syncing assembly 100 and can move with the conveyor 14). In the locked position, the first and second wheels 116, 118 may remain fixed with respect to the conveyor 14, while the wheels 44 may traverse the stationary tracks 22, 24 at the same speed as the conveyor 14.

The syncing assembly 100 is configured to remain in the locked configuration until the line assembly worker pushes on the process dolly 40. In other words, in response to applying a force that overcomes the bias of the first and second biasing members 112, 114, the first and second wheels 116, 118 may be configured to roll and allow the syncing assembly 100 to move from one location to another location. In some embodiments, compression of the first and second biasing members 112, 114 releases the first and second wheels 116, 118 from the locked position wherein the first and second wheels 116, 118 are configured to traverse the conveyor 14 (e.g., the person conveyor portion 16 of the conveyor 14) such that the process dolly 40 is unsynchronized from the movement of the conveyor 14 and can move freely along the stationary tracks 22, 24. An external force (e.g., a force in a direction parallel to the stationary tracks 22, 24) can be applied to the process dolly 40 (e.g., by the user) to overcome the bias of the first and second biasing members 112, 114 to cause the first and second wheels 116, 118 to traverse the conveyor 14 such that the process dolly 40 is unsynchronized from the movement of the conveyor 14 and can move along the conveyor 14 and/or the stationary tracks 22, 24 from a first position with respect to the work part 30 to a second position with respect to the work part 30. In this manner, an assembly line worker may work in different areas of the work part 30 simply by pushing the process dolly 40 along the conveyor 14 (e.g., along the person conveyor portion 16 of the conveyor 14). Moreover, the syncing assembly 100 may automatically (i.e., without any human intervention) lock the first and second wheels 116, 118 to the conveyor 14 after the external force is removed, thereby allowing the process dolly 40 to remain stationary with respect to the work part 30 while the assembly line worker continues working on the vehicle.

The syncing assembly 100 may include a first slide bearing 124, a second slide bearing 126, and a first stopper flange 128. The first slide bearing 124 may be configured to slidingly couple to the first arm 108. The second slide bearing 126 may be configured to slidingly couple to the first arm 108. The first biasing member 112 can be disposed between the first slide bearing 124 and the second slide bearing 126. The first stopper flange 128 can be coupled to the first arm 108, for example fixedly coupled to the first arm 108. In various embodiments, the first stopper flange 128 may be removably coupled to the first arm 108. The first stopper flange 128 can also be non-removably coupled to, and/or monolithically formed with, the first arm 108. For example, the first stopper flange 128 can be a clamp, a collar, or the like. The first stopper flange 128 can be fixed with respect to the first arm 108. In contrast, the first arm 108 can slide with respect to the first slide bearing 124 and the second slide bearing 126. In this manner, the first slide bearing 124 and the second slide bearing 126 may define apertures and/or channels through which the first arm 108 can translate or slide. The first biasing member 112 can extend between and to the second slide bearing 126 and the first stopper flange 128. A first end (e.g., a top end) of the first biasing member 112 can engage (i.e., contact) the second slide bearing 126 and a second, opposite end (e.g., a bottom end) of the first biasing member 112 can engage (i.e., contact) the first stopper flange 128. In this manner, the first biasing member 112 may be compressed between the second slide bearing 126 and the first stopper flange 128.

With the first stopper flange 128 fixed to the first arm 108 adjacent the first biasing member 112, the first biasing member 112 can bias the first stopper flange 128 toward the first slide bearing 124. The first stopper flange 128 can contact the first slide bearing 124 such that movement of the first arm 108 and the first stopper flange 128 with respect to the first and second slide bearings 124, 126 is limited to a predetermined position. Moreover, the first and second slide bearings 124, 126 can be coupled, e.g., fixedly coupled—to the frame 42 of the process dolly 40. In this manner, the first biasing member 112 tends to apply a biasing force on the first arm 108 via the first stopper flange 128 whereby the first wheel 116 is pressed against the moving conveyor 14 such that the process dolly 40 moves together with the conveyor 14. Stated differently, the first stopper flange 128 is configured to move under the force of the first biasing member 112 and thus moves the first arm 108 toward the first wheel 116, providing the pressure through the first wheel 116 against the moving person conveyor portion 16, achieving the locked position. The biasing force on the first arm 108 via the first stopper flange 128 can impart an opposing biasing force on the frame 42 of the process dolly 40 which tends to lift the process dolly 40 away from the conveyor 14 such that movement of the person conveyor portion 16 overcomes friction forces, if any, between the wheels 44 and the stationary tracks 22, 24.

The syncing assembly 100 may further include a third slide bearing 130, a fourth slide bearing 132, and a second stopper flange 134. The third slide bearing 130, the fourth slide bearing 132, and the second stopper flange 134 can be similar to the first slide bearing 124, the second slide bearing 126, and the first stopper flange 128, respectively. The third slide bearing 130 may be configured to slidingly couple to the second arm 110. The fourth slide bearing 132 may be configured to slidingly couple to the second arm 110. The second biasing member 114 can be disposed between the third slide bearing 130 and the fourth slide bearing 132. The second stopper flange 134 can be coupled to the second arm 110, for example fixedly coupled to the second arm 110. In various embodiments, the second stopper flange 134 may be removably coupled to the second arm 110. The second stopper flange 134 can also be non-removably coupled to, and/or monolithically formed with, the second arm 110. For example, the second stopper flange 134 can be a clamp, a collar, or the like. The second stopper flange 134 can be fixed with respect to the second arm 110. In contrast, the second arm 110 can slide with respect to the third slide bearing 130 and the fourth slide bearing 132. In this manner, the third slide bearing 130 and the fourth slide bearing 132 may define apertures and/or channels through which the second arm 110 can translate or slide. The second biasing member 114 can extend between and to the fourth slide bearing 132 and the second stopper flange 134. A first end (e.g., a top end) of the second biasing member 114 can engage (i.e., contact) the fourth slide bearing 132 and a second, opposite end (e.g., a bottom end) of the second biasing member 114 can engage (i.e., contact) the second stopper flange 134. In this manner, the second biasing member 114 may be compressed between the fourth slide bearing 132 and the second stopper flange 134.

With the second stopper flange 134 fixed to the second arm 110 adjacent the second biasing member 114, the second biasing member 114 can bias the second stopper flange 134 toward the third slide bearing 130. The second stopper flange 134 can contact the third slide bearing 130 such that movement of the second arm 110 and the second stopper flange 134 with respect to the third and fourth slide bearings 130, 132 is limited to a predetermined position. Moreover, the third and fourth slide bearings 130, 132 can be coupled, e.g., fixedly coupled—to the frame 42 of the process dolly 40. In this manner, the second biasing member 114 tends to apply a biasing force on the second arm 110 via the second stopper flange 134 whereby the second wheel 118 is pressed against the moving conveyor 14 such that the process dolly 40 moves together with the conveyor 14. Stated differently, the second stopper flange 134 is configured to move under the force of the second biasing member 114 and thus moves the second arm 110 toward the second wheel 118, providing the pressure through the second wheel 118 against the person conveyor portion 16, achieving the locked position. The biasing force on the second arm 110 via the second stopper flange 134 can impart an opposing biasing force on the frame 42 of the process dolly 40 which tends to lift the process dolly 40 away from the conveyor 14 such that movement of the person conveyor portion 16 overcomes friction forces, if any, between the wheels 44 and the stationary tracks 22, 24.

In various embodiments, the syncing apparatus 100 acts as an independent suspension system. For example, if the conveyor 14 is higher on one side of the syncing apparatus 100, then the biasing member (e.g., the first biasing member 112) on that side of the syncing apparatus 100 will compress thereby adding pressure to the associated wheel (e.g., the first wheel 116) conforming it to the conveyor 14.

Providing a syncing apparatus 100 of the present disclose to a process dolly (e.g., process dolly 40) provides an applied pressure to the wheels so that they conform to the conveyor allowing the dolly to stay stationary with respect to a work part until the assembly line worker desires to push the process dolly on to the next position on the process. In response to the process dolly (e.g., process dolly 40) being pushed by the operator, the wheels (e.g., the first and second wheels 116, 118) can roll on top of the conveyor 14 (e.g., on top of the person conveyor portion 16) until the desired position is achieved and the operator stops pushing the dolly.

In various embodiments, the first and second slide bearings 124, 126 are coupled to the support bracket 140 via a clamping mechanism, fasteners, or any other suitable coupling. In various embodiments, the first and second slide bearings 124, 126 are adjustably coupled to the support bracket 140 such that the syncing apparatus 100 can slide vertically and/or laterally with respect to the support bracket 140 to achieve a desired position with respect to the frame 42 and/or the person conveyor portion 16. In various embodiments, the third and fourth slide bearings 130, 132 are coupled to the support bracket 142 via a clamping mechanism, fasteners, or any other suitable coupling. In various embodiments, the third and fourth slide bearings 130, 132 are adjustably coupled to the support bracket 142 such that the syncing apparatus 100 can slide vertically and/or laterally with respect to the support bracket 142 to achieve a desired position with respect to the frame 42 and/or the person conveyor portion 16. In various embodiments, the support bracket 140 and/or the support bracket 142 are adjustably coupled to the frame 42 to allow for a position of the syncing apparatus 100 to be adjusted with respect to the frame 42 and/or the person conveyor portion 16.

Figure 4:
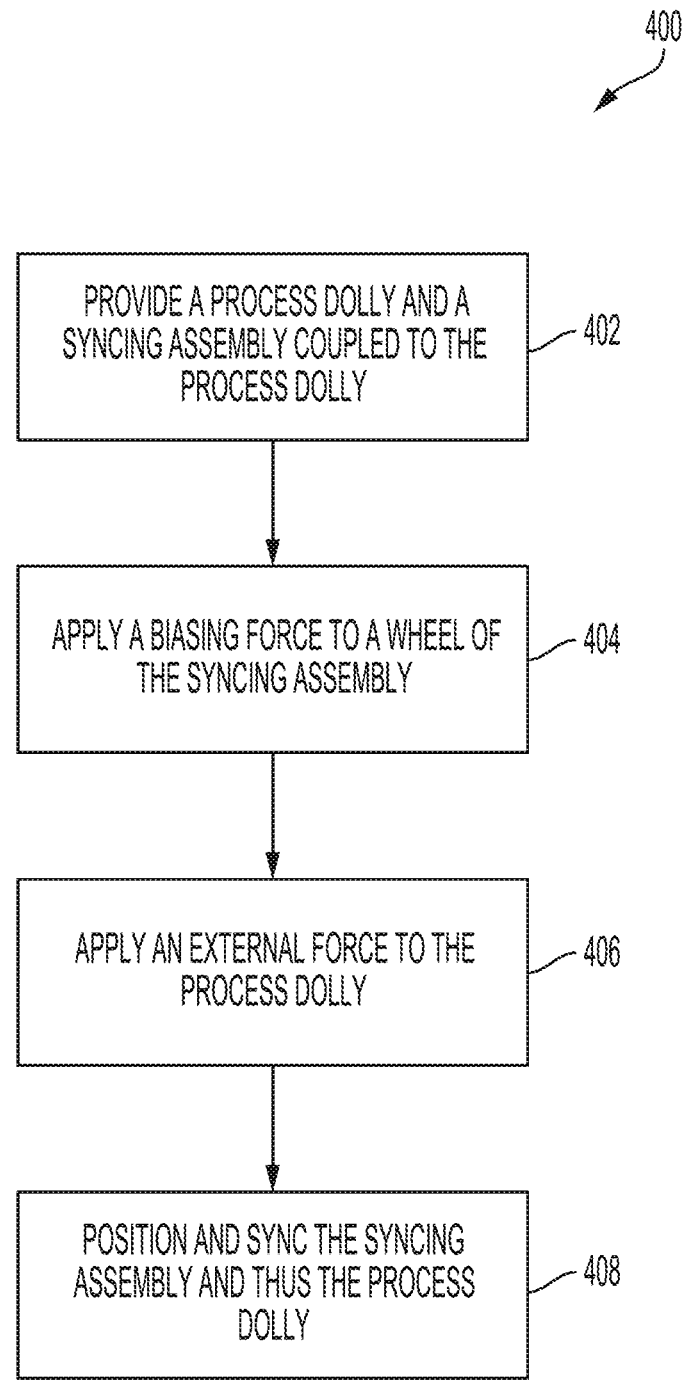
FIG. 4 is a flow diagram of an example process for using a conveyor assembly according to an aspect of the invention.

FIG. 4 is a flow diagram of an example process 400 for operating the conveyor assembly 10. At 402, a process dolly (e.g., process dolly 40) and a syncing assembly (e.g., syncing assembly 100) is provided along a conveyor (e.g., conveyor 14). The syncing assembly is configured to be coupled to the process dolly. At 404, a biasing force by at least one biasing member is applied to at least one wheel of the syncing assembly. The syncing assembly is thus in a locked position and a pressure is applied through the syncing assembly to a moving track thus positioning the process dolly with respect to at least one stationary track on the conveyor. Accordingly, the process dolly may move with the conveyor.

At 406, an external force opposite the biasing force may be applied to the syncing assembly by a user, thus releasing the syncing assembly from the locked position. Accordingly, the process dolly may move along the at least one stationary track.

At 408, the user positions the process dolly at a desired location along the conveyor and ceases applying the external force. Accordingly, the biasing force is applied by the syncing assembly such that the syncing assembly is placed in the locked position and synced to the conveyor.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A conveyor assembly comprising:
   a conveyor including a work part conveyor portion and a person conveyor portion configured to move parallel to one another at the same rate;
   at least one stationary track positioned parallel to the conveyor;
   a process dolly configured to operatively couple to the at least one stationary track; and
   a syncing apparatus configured to couple to the process dolly and operatively couple to the conveyor, the syncing apparatus includes a first wheel and a first biasing member configured to bias the first wheel in contact with the person conveyor portion to lock the process dolly in place along the conveyor.

2. The conveyor assembly of claim 1, wherein the at least one stationary track includes a first stationary track positioned between the work part conveyor portion and the person conveyor portion, and a second stationary track positioned at an outside edge of the person conveyor portion.

3. The conveyor assembly of claim 1, where the process dolly comprises:
   a frame; and
   at least one wheel rotatably coupled to the frame, the at least one wheel of the process dolly configured to operate within the at least one stationary track such that the process dolly is isolated from movement of the conveyor until the process dolly is synchronized.

4. The conveyor assembly of claim 1, wherein the syncing apparatus comprises:
   a main rail having a first end and a second end opposite the first end;
   a first arm configured to extend from the main rail at the first end; and
   a second arm configured to extend from the main rail at the second end.

5. The conveyor assembly of claim 4, wherein the syncing apparatus further comprises:
   the first biasing member configured to be disposed around the first arm; and
   a second biasing member configured to be disposed around the second arm.

6. The conveyor assembly of claim 5, wherein the syncing apparatus further comprises:
   the first wheel configured to couple to the first end of the main rail, the first biasing member operatively coupled to the first wheel and configured to bias the first wheel to a locked position; and
   a second wheel configured to couple to the second end of the main rail, the second biasing member operatively coupled to the second wheel and configured to bias the second wheel to the locked position, such that the first wheel and the second wheel are configured to contact the conveyor to synchronize the process dolly to a movement of the conveyor when the first wheel and the second wheel are biased in the locked position.

7. The conveyor assembly of claim 5, wherein the syncing apparatus further comprises:
   a first slide bearing configured to slidingly couple to the first arm;
   a second slide bearing configured to slidingly couple to the first arm adjacent the first biasing member; and
   a first stopper flange configured to couple to the first arm between the first slide bearing and the first biasing member.

8. The conveyor assembly of claim 7, wherein the syncing apparatus further comprises:
a third slide bearing configured to slidingly couple to the second arm;
a fourth slide bearing configured to slidingly couple to the second arm adjacent the second biasing member; and
a second stopper flange configured to couple to the second arm between the third slide bearing and the second biasing member.

9. The conveyor assembly of claim 7, wherein the first stopper flange is configured to move together with the first arm with respect to the first slide bearing and the second slide bearing against a bias of the first biasing member.

10. The conveyor assembly of claim 4, wherein the first arm and the second arm are configured to extend at least substantially perpendicular to the main rail.

11. A syncing apparatus configured to sync a process dolly with a conveyor, the syncing apparatus comprising:
a main rail having a first end and a second end opposite the first end;
a first arm configured to extend from the main rail at the first end;
a first biasing member configured to be disposed around the first arm; and
a first wheel configured to couple to the first end of the main rail, the first biasing member operatively coupled to the first wheel and configured to bias the first wheel to a locked position in contact with a person conveyor portion of the conveyor.

12. The syncing apparatus of claim 11, further comprising:
a second arm configured to extend from the main rail at the second end;
a second biasing member configured to be disposed around the second arm; and
a second wheel configured to couple to the second end of the main rail, the second biasing member operatively coupled to the second wheel and configured to bias the second wheel to the locked position, such that the first wheel and the second wheel are configured to contact the conveyor to synchronize the process dolly to a movement of the conveyor when the first wheel and the second wheel are biased in the locked position.

13. The syncing apparatus of claim 12, further comprising:
a first slide bearing configured to slidingly couple to the first arm;
a second slide bearing configured to slidingly couple to the first arm adjacent the first biasing member; and
a first stopper flange configured to couple to the first arm between the first slide bearing and the first biasing member.

14. The syncing apparatus of claim 13, further comprising:
a third slide bearing configured to slidingly couple to the second arm;
a fourth slide bearing configured to slidingly couple to the second arm adjacent the second biasing member; and
a second stopper flange configured to couple to the second arm between the third slide bearing and the second biasing member.

15. The syncing apparatus of claim 12, wherein the syncing apparatus is configured to be operatively coupled to the conveyor such that the syncing apparatus is configured to sync the process dolly in place along the conveyor.

16. The syncing apparatus of claim 15, where the process dolly comprises:
a frame; and
at least one wheel rotatably coupled to the frame, the at least one wheel of the process dolly configured to operate within at least one stationary track such that the process dolly is isolated from movement of the conveyor until the process dolly is synchronized.

17. A method of operating a conveyor assembly, the method comprising:
providing a process dolly;
providing a syncing assembly configured to couple to the process dolly; and
applying a biasing force via at least one biasing member of the syncing assembly to at least one wheel of the syncing assembly such that the syncing assembly is in a locked position with the at least one wheel in contact with a person conveyor portion of a conveyor of the conveyor assembly and the process dolly is synced with the conveyor of the conveyor assembly.

18. The method of claim 17, further comprising applying an external force to at least one of the process dolly or the syncing assembly to release the syncing assembly from the locked position.

19. The method of claim 18, further comprising:
positioning the process dolly at a desired position along the conveyor; and
reapplying the biasing force to the at least one wheel with the syncing assembly such that the syncing assembly is placed in the locked position and the process dolly is synced to the conveyor.

* * * * *